Figures 1, 2:
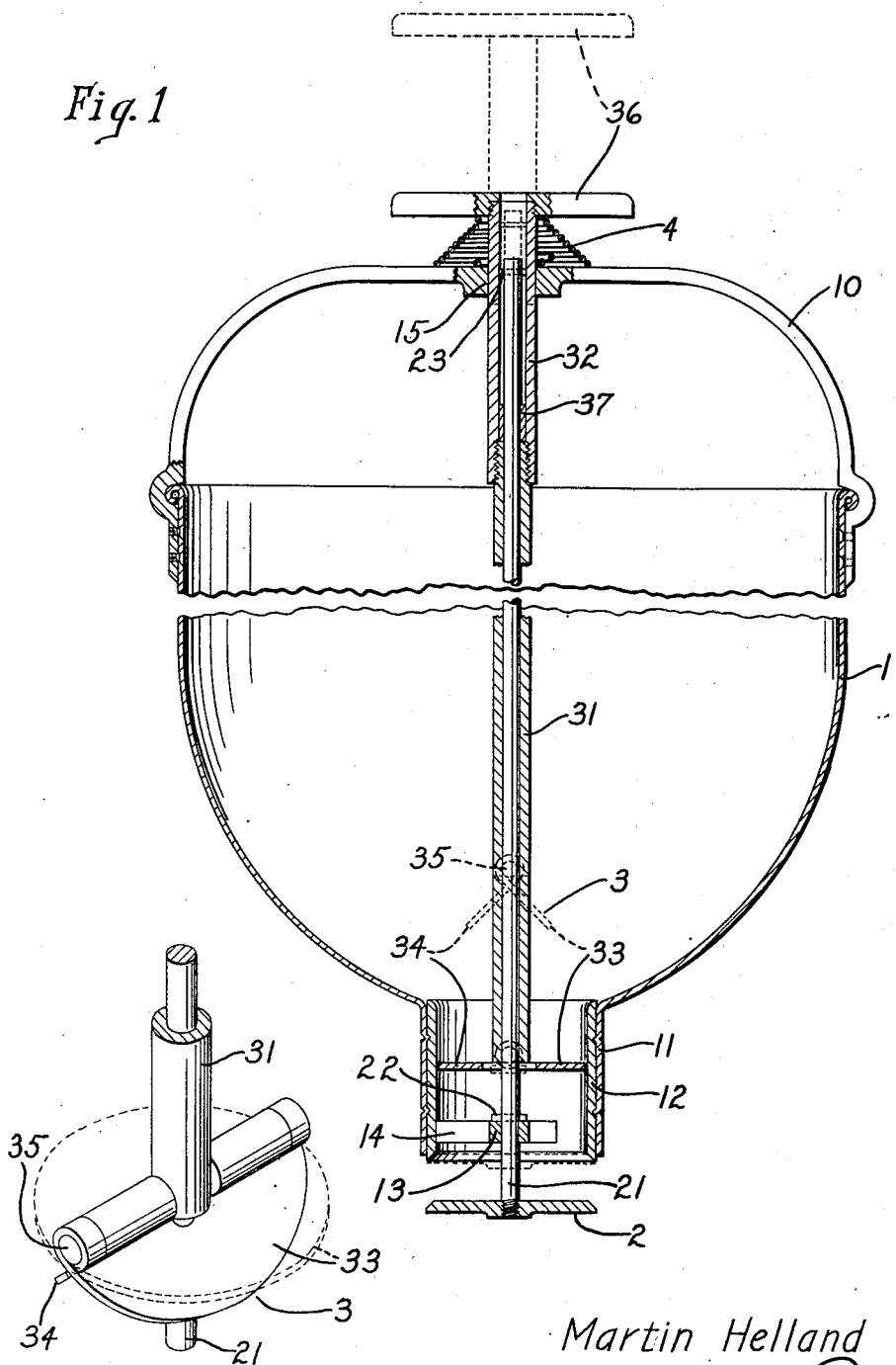

April 16, 1940.  M. HELLAND  2,197,270

PORTABLE DOUGHNUT MACHINE

Filed Nov. 13, 1939

Inventor
Martin Helland
By Charles L. Reynolds
Attorney

Patented Apr. 16, 1940

2,197,270

UNITED STATES PATENT OFFICE 2,197,270

PORTABLE DOUGHNUT MACHINE

Martin Helland, Los Angeles, Calif., assignor to Richardson & Holland, Inc., Seattle, Wash., a corporation of Washington Application November 13, 1939, Serial No. 304,021

13 Claims. (Cl. 107—14)

There are various doughnut machines capable of quantity production of doughnuts in an automatic or semi-automatic manner, but such machines are rather complex and large, and hence comparatively expensive, too expensive to be purchased by the small bakery operator who needs only to turn out a few dozen doughnuts a day, and who therefore neither needs the large capacity of existing machines, nor can afford to have its excess capacity and capital investment go unused. The present invention, therefore, concerns a portable doughnut machine, one which can be held in the hand of the operator, and operated while so held, and which will turn out a small quantity of perfect doughnuts, such a quantity as a small operator requires.

It is not merely the small size nor the portability of such a machine which constitutes the novelty therein, but rather, such a small machine must be differently constructed from prior machines, must be more simple, and of light weight, to adapt it to the conditions of portability and size, and the novelty in such a machine consists in the structural arrangement which enables such a machine to be made simply, to operate simply, to be held in the hand, though loaded with batter, and which enables it, under such conditions, to turn out perfect doughnuts with sufficient rapidity and ease. In some respects, these qualities are advantageous in a larger machine, hence, while the necessity of providing a small machine has motivated the present invention, certain principles thereof are quite usable and valuable even in a large, quantity production machine.

More specifically it is an object of the invention to provide a valve and a batter ejector, so interconnected that the operation of one affects in the proper manner and in the proper time sequence the operation of the other, to the end that the two may move together to advance batter toward a discharge opening or spout; the valve will then automatically stop, but the ejector will continue to advance the batter so that the batter will exude all about the valve; the ejector will then withdraw, but by reason of its structure will not cause the exuded batter to be drawn back; and finally the two will move upwardly together, but in such manner that the ejector still does not tend to withdraw the exuded batter, but the valve eventually will cut off the exuded batter, and cause it to drop into the hot fat, and the device will then be ready, with a further reciprocation of the ejector and valve, to discharge the batter for a second doughnut.

The invention consists, therefore, in the novel parts, and in the novel arrangement and interconnection thereof, to achieve the ends above, all as will be explained in greater detail hereafter, and as is shown in the accompanying drawing, and the novel features wherein lie my invention will be defined by the claims which terminate this specification.

In the accompanying drawing my invention is shown in a form which is now preferred by me, although as will be understood, and as will be pointed out hereafter, the form and arrangement of the parts and their relationship to one another may be altered within the scope of the claims.

Figure 1 is an axial section through the device as a whole, showing parts, in full lines, in the relative positions they would occupy at the moment of reversing their previous downward movement and starting their upward movement, to commence the cut-off of exuded batter for dropping the latter into the hot fat, and showing in dash lines the position parts would occupy at the completion of the cut-off of the batter, and just prior to the commencement of the exudation of the batter for the next doughnut.

Figure 2 is a detail view, in perspective, of the ejector and associated parts, showing the ejector in full lines and in dash lines in its two limiting positions.

The batter is contained within a bowl 1, which is made of such diameter and depth as to hold the requisite amount of batter, yet not so much batter that the entire device, loaded, cannot be readily supported by means of a bow-like handle 10 which spans the top of the bowl 1. At its bottom the bowl converges to and terminates in a spout 11, downwardly directed. Since the bowl may conveniently be formed from sheet metal as a spinning or stamping, it may be preferred, as shown herein, to provide the spout 11 with an inserted bushing or liner 12, which may be somewhat more accurately formed, by machining, for instance, the sleeve 12 being suitably and rigidly held in place within the spout 11, and in effect constituting part of the spout.

The bottom of the spout is normally closed by a valve 2, carried upon the end of a valve stem 21, which extends upwardly through the spout and the bowl, the valve normally seating against the lower end of the spout. The valve is suitably urged toward and held in this closed position, as by a spring 4, operatively connected to the valve stem by means which will be presently described. Downward movement of the valve and its stem is limited to the spacing shown in full lines in Figure 1, by means such as the cross pin 22, received in the valve stem 21, and engageable with a shoulder, such as the upper side of a guide 13, which embraces the stem 21 and which is formed as part of or secured within the spout. The guide 13, for instance, may be supported by a spider 14, the whole being cast as a part of the sleeve 12.

As may be understood, no batter may be discharged from the bottom of the spout 11 until the valve 2 is permitted to open, but even if the valve is permitted to open, the discharge of the comparatively thick batter will be irregular and uncontrollable, even if possible, unless there is some means for positively ejecting a reasonably accurately measured charge of the batter, and for cutting it off from the remainder of the batter. To this end I provide an ejector 3, carried upon an ejector stem 31, which in this instance is tubular and surrounds the stem 21, so that the two stems mutually guide one another. The ejector stem 31, or an upper, larger extension 32 thereof, is guided within the guide 15, which as shown constitutes part of the supporting handle 10. Since the stem 31 or its upward extension 32 is guided at 15, the stem 21 is guided at 13, and the stems 21 and 31 mutually guide one another, the two stems are held and guided for vertical movement, but this movement is to a certain degree independent, as will shortly appear.

Preferably the ejector 3 is collapsible upon upward movement, but is expansible and self-stiffening upon downward movement. By making it collapsible upon meeting the resistance of the batter to upward movement, the ejector will move upward through the batter with the least resistance. By making it expansible and self-stiffening upon meeting the resistance of the batter to downward movement, and by making the ejector as a whole of a size such as will fit snugly within the spout 11 or its liner 12, it is insured that the ejector will positively move the batter downwardly through the spout, and will discharge a reasonably accurately measured charge thereof. The ejector is made collapsible in the present instance by forming it of two or more vanes 33 and 34, each hingedly mounted upon a common axis 35 extending transversely to the direction of movement of the ejector, and so formed, with relation to each other and with relation to the end of the tubular stem 31, against which they may contact, that upon upward movement of the ejector and its stem any resistance encountered, or even the force of gravity, causes the vanes 33 and 34 to swing downwardly upon the pivot 35, and thus to collapse into the dash line position shown in Figure 1, or the full line position of Figure 2, whereas, upon downward movement of the ejector and its stem 31, immediately the ejector encounters the resistance of the batter, the ejector is spread open and is stopped in a position where the vanes 33 and 34 are substantially in a common plane, as shown in full lines in Figure 1, thereby acting as a plunger, fitting closely within the sleeve 12 to advance the batter before it. Such downward movement of the ejector is accomplished by pressure upon a head 36, secured upon the upper end of the stem extension 32, whereby the ejector is directly pressed downwardly in opposition to the force of the spring 4, which reacts between the handle 10 and the head 36. Upon release of manual pressure upon the head 36 the spring 4 returns the ejector to its upper position.

The valve 2 and the ejector 3, or their respective stems 21 and 31, are interconnected so that the movement of the ejector downward permits opening movement of the valve, and return movement of the ejector closes the valve; the closure of the valve limits the extent of upward movement of the ejector. To this end the upper end of the stem 31 constitutes a shoulder within the extension 32, against which shoulder, or against a spacer sleeve 37, which in effect varies the elevation of this shoulder, seats a cross pin 23, carried by the valve stem 21. At the same time, when downward movement of the valve stem is halted by engagement of the cross pin 22 with the guide 13, the tubular ejector stem 31 may move downwardly relative to the cross pin 23. Conversely, upon upward movement of the ejector stem 31, under the influence of the spring 4, the final portion of the upward movement of the stem 31 will cause its shoulder or the spacer 37 to engage the cross pin 23, and to move the valve 2 upwardly conjointly with the ejector 3, until seating of the valve stops and limits upward movement of the ejector.

The parts are so arranged and proportioned that when parts are in position of rest, shown in the dash lines of Figure 1, the valve 2 is seated against the lower end of the spout, and the ejector 3, collapsed, is within the bowl 1, above the upper end of the spout. Initial downward movement of the stem 31 of course moves the ejector 3 downward, normally causing it to expand and to stiffen, but also permitting downward movement of the valve 2 at the same rate, so that the ejector 3 and valve 2 in effect move substantially jointly downwardly. Such movement continues until the pin 22 contacts with the guide 13, whereupon downward movement of the valve 2 stops. The ejector 3 at this time may not quite have entered the upper end of the spout 11, but at least has approached quite close to the upper end thereof. In this way there has been collected, and in effect substantially trapped within the spout, and below it, and between the valve and the ejector, a charge of batter, a part of which is sufficient to constitute one doughnut.

The valve 2 having been stopped in this position, the ejector 3 is still free to continue its downward movement, and does so, entering the sleeve 12. Because the ejector is now moving downward relative to the valve 2 the segregated charge of batter is exuded between the spout and the valve, and tends to flow down and to drop over the circumferential edge of the valve. The quantity thus exuded depends upon the initial or normal spacing between the ejector 3 and valve 2, controllable by the use of spacers 37 of greater or lesser length, and upon the extent of independent movement of the ejector. The exuded charge of batter may drop free, but normally the batter will be so stiff that it will not drop unaided. Accordingly, when the ejector has been pressed downwardly to a sufficient degree to exude a sufficient amount of batter, the handle 31 is released, the spring 4 moves it upwardly, and immediately it collapses to a position where it will not tend to withdraw the charge of batter which has just been exuded. The ejector then moves upwardly until the end of the stem 31 or the spacer 37 engages the cross pin 23, and by this time the ejector is clearing or has cleared the upper end of the spout. Continued upward movement of the ejector entrains upward movement of the valve, and since there is no tendency to draw back into the bowl the exuded batter, and since there is a tendency for the upwardly moving valve to cut it off between itself and the lower end of the spout, this is what eventually occurs; the ring of exuded batter drops clear, and the valve closes. Parts are by now restored to their respective positions of rest, as shown in dash lines in Figure 1, and the operation of dropping one doughnut has been completed. This operation can be repeated as many times as there is batter available, or as desired, and in this manner doughnuts are quickly dropped, by simple yet light and portable mechanism.

It has been indicated that the spring 4 returns parts to their position of rest, and holds the valve 2 closed. This has been found sufficient in practice. On the other hand, it is quite within the purview of this invention to provide positive means to effect return of the ejector 3 and the valve 2 to their position of rest, so that reliance need not be placed upon the yieldable spring. It will be noted that it is the seating of the valve 2 which limits upward movement of the ejector, through the engagement of the cross pin 23 with the end of the spacer 37.

What I claim as my invention is:

1. A doughnut machine comprising a bowl having a bottom spout for discharge of batter, an ejector movable from within the bowl downwardly into the spout, and formed, relative to the spout, to eject batter therethrough, a stem carrying said ejector, and extending upwardly to the top of the bowl, a spring urging said stem and ejector to their uppermost position, a valve formed to seat against the lower end of the spout to close the same, a stem carrying said valve and extending upwardly to the top of the bowl, cooperating stop means interengageable between the valve and its stem and the ejector and its stem, to seat the valve by the upward urging of the spring, and to limit thereby the upward movement of the ejector, and further stop means interengageable between the valve and its stem and the bowl, to limit downward opening movement of the valve, prior to the ejector's reaching the limit of its downward movement, whereby the ejector may continue downward after the valve's downward movement has ceased.

2. The combination of claim 1, wherein the second stop means are so located, relative to the path of movement of the ejector, that the downward movement of the valve ceases before the ejector has entered the spout, and the continued downward movement of the ejector moves the ejector into the spout and forces batter from within the spout outwardly between the spout and the stopped valve.

3. The combination of claim 1, characterized in that the ejector is formed and arranged to collapse downwardly upon encountering resistance to its upward movement, to avoid appreciable movement of the batter upwardly with it, and to be self-stiffening upon encountering resistance to its downward movement, in the latter case to force batter downwardly before it.

4. The combination of claim 1, characterized in that the ejector is formed as a plurality of vanes, means pivotally supporting each of said vanes from the ejector stem upon a transverse axis, and stop means reacting between the vanes and the ejector stem to position them in a substantially common transverse plane upon encountering resistance to downward movement, and otherwise in downwardly inclined planes.

5. The combination of claim 1, wherein the ejector stem is hollow, and the valve stem is guided therein for vertical movement between the limits fixed by the respective stop means, and further guide means interengaged between the bowl and the stems, to dispose the latter axially of the spout and bowl.

6. The combination of claim 1, wherein the ejector stem is hollow, and the valve stem is guided therein for vertical movement between the limits fixed by the respective stop means, and further guide means interengaged between the bowl and the stems, to dispose the latter axially of the spout and bowl, and wherein the stop means between the valve stem and the ejector stem comprises an internal shoulder on the tubular ejector stem and a complemental cross pin upon the valve stem, and wherein the stop means between the valve stem and the bowl comprises a cross pin upon the valve stem, below the ejector stem, positioned to engage a stem guide upon the bowl.

7. The combination of claim 1, including a handle extending across the top of the bowl, formed with a guide receiving and cooperating with the stems, and a head upon the upper end of the ejector stem, spaced normally above the handle, and movable downwardly towards the handle, in opposition to the spring, by the hand which supports the bowl by the handle.

8. A portable doughnut machine comprising a bowl having a cylindrical bottom spout for discharge of batter, a valve for closing said spout, a stem carrying said valve, and extending upwardly to the top of the bowl, a circular dough ejector movable from within the bowl into the spout, and of a size and shape, during downward movement, to closely fit within the spout, to advance batter through the spout, a tubular stem carrying said ejector, extending upwardly to the top of the bowl, and enclosing and guiding the valve stem, a handle spanning the top of the bowl, and guiding the ejector stem, a head upon the latter, above the handle, a spring between the handle and head, and normally holding said ejector in its uppermost position, means operatively connecting the tubular ejector stem and the enclosed valve stem, to raise the valve to closed position by the final upward movement of the ejector, and to permit downward opening movement of the valve by the initial and equal downward movement of the ejector, and stop means acting upon the valve stem, prior to the entrance of the ejector into the spout, to stop downward opening movement of the valve, but permitting continued downward movement of the ejector within the spout.

9. In a doughnut machine, in combination with a bowl having a downwardly opening spout, a valve normally seating against the end of said spout to close it, and movable downwardly to permit ejection of batter, an ejector movable from a normal position within the bowl downwardly into the spout, and means operatively interconnecting the ejector and the valve to position the two in their respective normal positions, and permitting their initial conjoint and substantially equal movement downwardly, means to stop such downward movement of the valve only, the ejector being further movable downwardly and then upwardly independently of the valve, and said means interconnecting the valve and the ejector including stop means engageable to effect their final conjoint upward and substantially equal movement to valve-closed position, following initial upward movement of the ejector independently of the valve.

10. In a doughnut machine, in combination with a bowl having a downwardly opening spout, a valve normally seating against the end of said spout to close it, and movable downwardly to permit ejection of batter, an ejector movable from a normal position within the bowl downwardly into the spout, said ejector being formed of a plurality of elements hingedly mounted and free to swing downwardly by gravity or upon encountering resistance to their upward movement, but swingable upwardly to define a substantially horizontal plane upon encountering resistance to downward movement, stop means engageable with said ejector elements to prevent their upward swinging movement beyond such a horizontal plane, and means operatively interconnecting the ejector and the valve to position the two in their respective normal positions, and permitting their initial conjoint and substantially equal movement downwardly, means to stop such downward movement of the valve only, the ejector being further movable downwardly and then upwardly independently of the valve, and said means interconnecting the valve and the ejector including stop means engageable to effect their final conjoint upward and substantially equal movement to valve-closed position, following initial upward movement of the ejector independently of the valve.

11. In a doughnut machine, in combination with a bowl having a downwardly opening spout of given length, a valve normally seating against the end of said spout to close it, and movable downwardly to permit ejection of the batter, an ejector movable from a normal position within the bowl and above the upper end of the spout, downwardly to and within the spout, means operatively interconnecting the ejector and the valve to position the two in their respective normal positions, and permitting their conjoint and substantially equal initial movement downwardly, means to stop such downward movement of the valve only, when the ejector has substantially reached the upper end of the spout, the ejector being further movable downwardly and then initially upwardly independently of the valve, and said means which interconnect the valve and the ejector including stop means engageable to effect their final conjoint upward and substantially equal movement to valve-closed position, following the initial upward movement of the ejector independently of the valve.

12. In a doughnut machine, in combination with a bowl having a downwardly opening spout, a valve normally closing the lower end of said spout, and movable downwardly to permit ejection of batter, an ejector movable from a normal position within the bowl downwardly into the spout, a member carrying said ejector reciprocable lengthwise of the bowl and spout, said ejector being collapsible about such reciprocable member upon encountering resistance to upward movement, but being expansible to substantially the size of the spout upon encountering resistance to downward movement, and means operable from above the bowl to reciprocate said member for moving the ejector from within the bowl downwardly into the spout.

13. In a doughnut machine, in combination with a bowl having a downwardly opening spout, a valve normally closing the lower end of said spout, and movable downwardly to permit ejection of batter, an ejector movable from a normal position within the bowl downwardly into the spout, and formed of a plurality of elements centrally hinged together and free to swing downwardly by gravity or upon encountering resistance to the upward movement, but swingable upwardly to define a substantially horizontal plane structure substantially the size of the spout upon encountering resistance to downward movement, a member carrying said ejector reciprocable lengthwise of the spout, and means operable for reciprocating said member to move said ejector from a normal position within the bowl downwardly into the spout and then upwardly out of the spout and back into the body independently of movement of said valve.

MARTIN HELLAND.